Patented Dec. 22, 1931

1,837,516

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

STEERING MEANS FOR MOTOR VEHICLES

Application filed December 27, 1928. Serial No. 328,765.

This invention relates to means for connecting the pivoted spindles which carry the front or steering wheels of a motor vehicle, and has for its object to provide connecting means of such a character as will minimize the tendency of such wheels to "shimmy" and "tramp".

The more particular objects of the invention, together with means whereby the latter may be carried into effect, will best be understood from the following description of a preferred form thereof illustrated in the accompanying drawings, it being recognized, however, that the particular construction described and shown has been chosen for purposes of exemplification merely, and that the invention, as defined by the claims hereunto appended, may be otherwise embodied without departure from the spirit and scope thereof.

Figure 1:
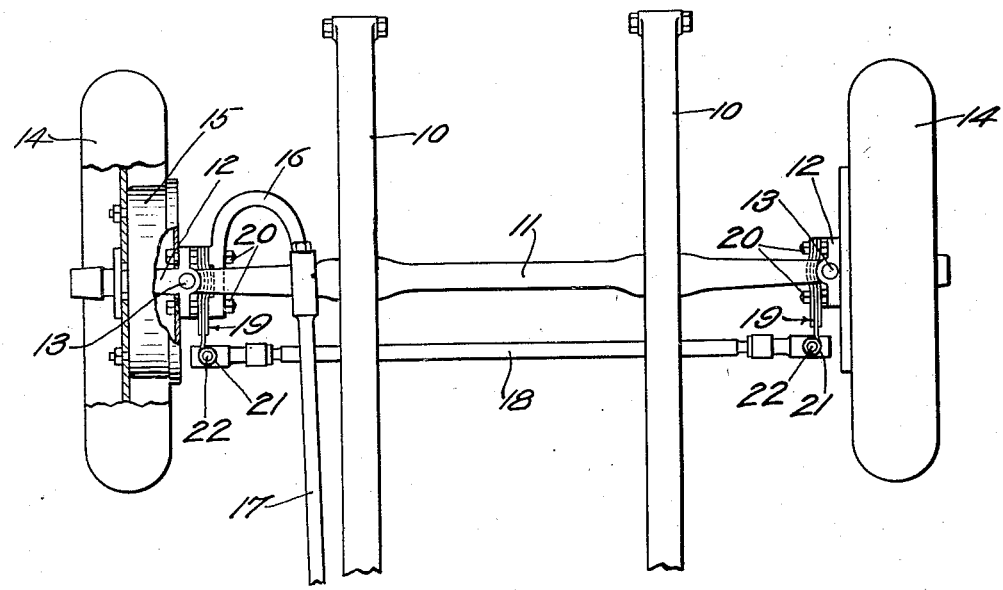
Fig. 1 is a plan view, partly broken away, of the forward end of a motor vehicle chassis having steering means embodying the invention.

Referring to the drawings, 10 denotes the chassis frame side members and 11 the front axle having at its ends the usual steering knuckles including spindles 12 pivoted to the ends of the axle by king or pintle pins 13 and having rotatably mounted thereon the front or steering wheels 14, the latter being shown as provided with brake drums 15. One of the wheel-carrying spindles 12 is provided with the usual steering arm 16 connected by the drag link 17 with the usual steering gear, not shown.

Figure 3:
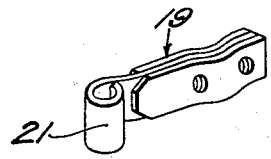
Fig. 3 is a detail perspective view of one of the spring arms detached.
Figure 2:
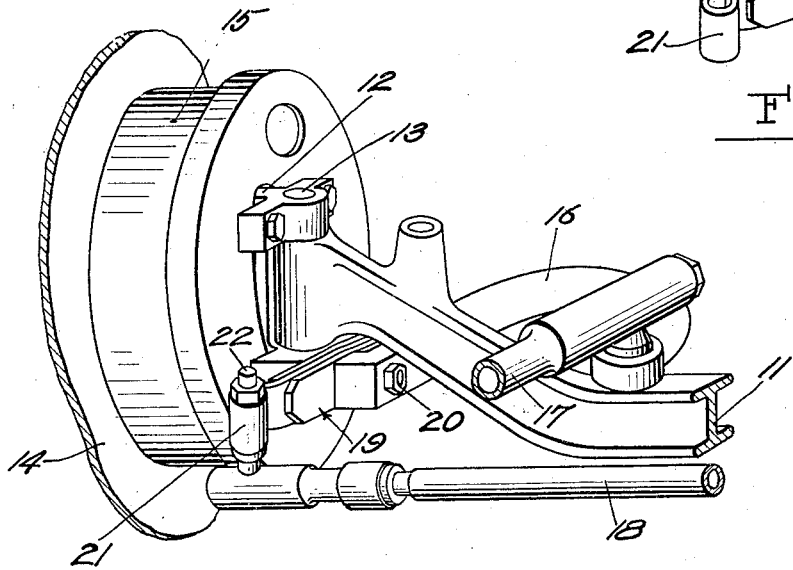
Fig. 2 is a fragmentary perspective view of one of the steering knuckles.

The parts above referred to, except as they enter into combination with parts hereinafter described, or as otherwise pointed out, may be of any usual form and arrangement and specifically constitute no portion of the present invention. In accordance with the latter, the means employed for connecting the pivoted wheel-carrying spindles 12, so as to be turned substantially in unison by the steering gear in steering the vehicle, is of a resilient character, or includes a resilient element. In the preferred construction shown, the usual tie rod 18 is connected at its ends to the free ends of resilient arms 19 projecting from the spindles 12. Preferably, and as shown most clearly in Fig. 3, each of the arms 19 comprises a multiple leaf spring rigidly secured at its butt end, as by bolts 20 (Figs. 1 and 2), to the spindle, the free end of the longest leaf being formed with an eye 21 to receive a stud 22 projecting from the tie rod 18. As shown in Figs. 1 and 2, the bolts 20 may be conveniently employed to secure the steering arm 16 to its spindle 12, in which case the butt end of the corresponding spring arm 19 is clamped by said bolts between said arm and spindle.

The resilient connection above described between the pivoted spindles which carry the steering wheels tends to prevent synchronism of vibration between the wheels and thereby minimizes the tendency thereof to "shimmy" and "tramp".

What I claim is:

1. In a motor vehicle, the combination with the pivoted wheel-carrying spindles, of resilient arms projecting from said spindles, and a tie rod connecting said arms.

2. In a motor vehicle, the combination with the pivoted wheel-carrying spindles, of a multiple leaf spring rigidly secured at its butt end to each of said spindles, and a tie rod connected at its ends to the free ends of said springs.

3. In a motor vehicle, the combination with the pivoted wheel-carrying spindles, of resilient arms projecting from said spindles and each comprising a multiple leaf spring, bolts securing the butt ends of said springs to said spindles, a steering arm secured to one of said spindles by the spring-securing bolts and clamping the butt end of the corresponding spring between itself and said spindle, and a tie rod connected at its ends to the free ends of said springs.

In testimony whereof I affix my signature.

STUART G. BAITS.